(12) United States Patent
Ceri et al.

(10) Patent No.: US 8,180,768 B2
(45) Date of Patent: May 15, 2012

(54) METHOD FOR EXTRACTING, MERGING AND RANKING SEARCH ENGINE RESULTS

(75) Inventors: Stefano Ceri, Milan (IT); Daniele Braga, Milan (IT); Marco Brambilla, Cantú (IT); Alessandro Campi, Misinto MB (IT); Emanuele Della Valle, Varese (IT); Piero Fraternali, Erba (IT); Davide Martinenghi, Milan (IT); Marco Tagliasacchi, Carate Urio (IT)

(73) Assignee: Politecnico Di Milano, Milan MI (IT)

( * ) Notice: Subject to any disclaimer, the term of this patent is extended or adjusted under 35 U.S.C. 154(b) by 262 days.

(21) Appl. No.: 12/540,700

(22) Filed: Aug. 13, 2009

(65) Prior Publication Data

US 2011/0040749 A1 Feb. 17, 2011

(51) Int. Cl.
*G06F 7/00* (2006.01)
*G06F 17/30* (2006.01)
(52) U.S. Cl. ........................................................ 707/728
(58) Field of Classification Search ........... 707/999.101, 707/723, 728
See application file for complete search history.

(56) References Cited

U.S. PATENT DOCUMENTS

| 7,519,605 | B2 * | 4/2009 | Vailaya et al. | 707/999.005 |
| 7,599,928 | B2 * | 10/2009 | Smyth et al. | 707/999.005 |
| 2006/0167842 | A1 * | 7/2006 | Watson | 707/999.003 |
| 2007/0061318 | A1 * | 3/2007 | Azizi et al. | 707/999.004 |
| 2010/0070448 | A1 * | 3/2010 | Omoigui | 706/47 |
| 2010/0281028 | A1 * | 11/2010 | Luo et al. | 707/741 |

* cited by examiner

*Primary Examiner* — Apu Mofiz
*Assistant Examiner* — Bryan Walker
(74) *Attorney, Agent, or Firm* — Nixon & Vanderhye PC

(57) ABSTRACT

A method and a computer program product for identifying the domains, selecting for each domain one domain-specific search engine and data source to be involved, generating the domain-specific subqueries for each selected search engine, defining a strategy for sending requests to each search engine and data source, and receiving, merging and ranking results. The result of the multi-domain query is a list of combinations, where every combination consists of a tuple of data, each relative to one of the domains of the query; such data is present in the results returned either by search engines or by data sources. The method provides the combinations having the highest combination score, as computed by a monotone aggregation function over the combinations.

17 Claims, 5 Drawing Sheets

METHOD FOR EXTRACTING, MERGING AND RANKING SEARCH ENGINE RESULTS

FIELD OF THE INVENTION

The present invention generally relates to answering multi-domain queries that require invoking several domain-specific search engines. In particular, the present invention relates to a method to extract, merge and rank results of subqueries issued to one search engine and one data source for each said domain. It details an algorithm that computes an optimal strategy that minimizes the expected total cost associated with the invocations to said search engines and data sources needed to calculate the best K answers to the multi-domain query posed by the user.

BACKGROUND OF THE INVENTION

The World Wide Web (WWW) is a connected collection of computers offering to world-wide spread users the possibility to extract information in response to queries. The process of information extraction includes accessing information which is stored, in the format of Web pages, into a class of computer systems, called Data Sources; in order to locate such Web Pages, users rely on another class of computer systems, called Search Engines, whose specific ability is to extract those Web Pages which with higher probability contain information that is relevant to the query. Given the huge number of Web Pages and the breadth of information which is available on the World Wide Web, the spreading and success of Search Engines has increasingly grown in the last decade.

A typical search engine offers an interface where the users enter a query expression consisting of keywords, sometimes interconnected by logical operators. The search engine uses pre-calculated index structures in order to produce the results that best match with the query expression, and present their result in the form of a ranked list of elements. Every element is usually further characterized by a hyperlink pointing to a Web Page and of additional descriptions of the content of the Web Page. Elements are ranked by the search engine with an element score, and presented on the computer interface in ranking order; the computer interface comprises a given number of elements, and navigational commands on the interface allow the user to extract more elements, or to change the query, or to follow one of the links associated with one of the elements.

An exemplary search engine is the Google® search engine. Such system uses a ranking technique, called the PageRank algorithm, which gives to each Web Page a score which uses as a measure of the relevance of such Web Page a metrics related to relevance of other Web pages containing hyperlinks pointing to it. Reference is made to L. Page, et. al., "The PageRank citation ranking: Bringing order to the web", technical report, Stanford Digital Library Technologies Project, 1998. Paper SIDL-WP-1999-1020. The PageRank algorithm has proven to be very effective for general-purpose search, i.e. for queries which have no associated, predefined domain of interest.

In addition to general-purpose search engines, a number of search engines exist which are specifically dedicated to given domains. Examples of broad domains are: travels, books, cars; examples of narrower domains are research centers within a given field or country, hospitals in a given city. Examples of domain-specific search engines for travels are: Expedia®, EasyFly® and TravelAdvisor® search engines. Domain-specific search engines outperform general purpose search engines for domain-specific queries, because they use specific knowledge about their domains of interest. In the case of travels, they can use information about travelling time, fares, connections, and so on in order to inform the user about the "best" travel combination, where "best" is further characterized according to the user indications, who may be interested in aspects such as total cost, total travel duration, desired departure and arrival times, and so on.

The background material for the method is classified into three categories, which are analyzed next. The first one is concerned with extracting the best document from a document collection where several rankings are possible; the second one concerns merging search results where each result is ranked; and the third one concerns multi-domain queries.

A vast amount of work has been performed for addressing the issue of extracting the best documents from a document collection upon which several rankings are available. Examples include Fagin's Algorithm (FA), as described in Ronald Fagin, "Combining Fuzzy Information from Multiple Systems", Journal of Computer and System Sciences, 1999, Volume 58(1): 83-99, the Threshold Algorithm (TA) as described in Ronald Fagin, et. al., "Optimal Aggregation Algorithms for Middleware", IBM Research Report RJ 10205, 2000, pp. 1-40, the Quick-Combine Algorithm (QA) as described in Ulrich Guntzer et. al. "Optimizing Multi-Feature Queries for Image Databases", Proceedings of the Very Large Data Bases (VLDB) Conference, Cairo, Egypt, August 2000, pp. 419-428, and the HRJN algorithm as described in Ihab F. Ilyas et al., "Supporting top-k join queries in relational databases", VLDB Journal, 2004, Volume 13(3); 207-221.

FA considers a collection of elements (such as textual documents) and assumes that several distinct rankings can be used for extracting the elements from the collection. Accordingly, elements can either be accessed by a sequential access, according to one of the various rankings, or by a random access, using specific information of each element, which is different in every element and therefore constitutes an element identifier; the FA algorithm assumes a computer system that can support both sequential accesses and random accesses. The aforementioned reference illustrates the FA algorithm in the case where the sequential access costs are identical and the random access costs are also all identical. Each element is associated with an overall element score, defined as a monotone aggregation function of the scores of the element in the available rankings. Then, the purpose of the FA algorithm is extracting the "top K" elements of the collection, i.e. the K elements with maximal overall element score, by minimizing the cost of extraction; instead of reading all elements from all the ranked lists. FA starts accessing elements by making sequential accesses and stops when K common elements have been found, and then performs additional random accesses in order to guarantee that the set of elements that are accessed, either by sequential or random accesses, include the "top K" elements, that can therefore be presented as the output of the FA algorithm.

In TA, sequential accesses are made to each ranked list to retrieve elements and their element score, and, for each retrieved element, a random access is made to retrieve the element score of that element on the other ranked lists so as to determine the element's overall score, which is computed via a given monotone aggregation function combining the individual element scores of the elements in the available rankings. Element retrieval is stopped as soon as there are K elements with an overall score that is below a threshold computed via the aggregation function over the element scores of the last seen elements in each ranked list. QA uses a similar idea as TA but attempts improving the global cost, by reading more elements from the less expensive rankings.

HRJN is an operator that addresses the rank-join problem, i.e., the problem of computing joins in top-k queries. It is an extension of TA to the rank-join problem, in which the goal is to compute the top K combinations of elements that match on a given subset of their properties (join attributes).

The need for modular scoring systems for merging search results in the context of document bases, of Intranets, and of the World Wide Web is the objective of the U.S. Pat. No. 7,257,577 B2, August 2007. The modular scoring system merges search results into an ranked list of results using many different features of documents. The block diagram of the high-level architecture of the modular score system, illustrated in FIG. 2, includes scoring modules based upon the indexing of textual properties of the documents (such as content, title, and anchor text) as well as processors which use generic document properties, such as their page rank; indegree; discovery date; URL words, depth, and length; and geography. For example, in one of the proposed approaches, a rank aggregation processor uses a graph method that uses as input, for every document, its position in the ranking; the algorithm operates upon collections of edges from documents to positions, where every edge <D, P> defines the cost of ranking the document D in position P. The method uses a minimum-cost perfect matching to assign a unique score to each document, thereby building a global ranking.

The problem of combining multiple ranked lists into a single ranked list is considered in the following references. In the Patent Application US 2006/0190425, August 2006, a framework for incrementally joining ranked lists, while minimizing memory constraints and disk or memory swapping costs, is presented. The framework focuses on a specific aspect of the architecture of a computer system and does not take into account the articulation of the methods and systems available on the Web. In the U.S. Pat. No. 6,728,704 B2, April 2004, a method and apparatus for merging result lists from multiple search engines is presented. The method operates on sub lists which are produced by a given query independently performed upon many search engines, and merges such sub lists into a single list by first computing the average score of the list elements, then extracting those elements from the list with highest score and simultaneously reducing the length of the list by one. The result is therefore a merged list of the sub lists extracted from every Search Engine, without modifications to individual entries of the list.

While general-purpose search engines and domain-specific search engines address the needs of many users for locating pages in the World Wide Web, they are not performing well when a user presents a multi-domain query, i.e., a query which addresses multiple domains at the same time. Such queries require information extracted from search engines and data sources relative to two or more domains, such as travels and musical events, or care centers and doctor specializations and insurance coverage.

For these queries, which are classified as multi-domain queries, specific query management methods are designed. Reference is made to Daniele Braga, et. al., "Optimization of Multi-Domain Queries on the Web", Proceedings of the Very Large Data Bases (VLDB) Conference, Auckland, New Zealand, August 2008, pp, 562-573, where the notion of Multi-Domain Query is first introduced, and a model for their management is presented. A multi-domain query is received through a user interface and presented to Search Engines, which extract ranked lists of elements. The model presents a collection of operations for manipulating such ranked lists; operations collectively constitute a computer program that produces an answer to the multi-domain query. The aforementioned reference presents also a collection of approximate (heuristic) methods for selecting a Query Plan for a given multi-domain query, where a query plan is a well-defined chain of requests upon selected Search Engines for answering the query. The query plan selection is based upon the association of each operation to costs of execution. An important operation is the join of the ranked lists produced by two Search Engines; reference is made to Daniele Braga, et. al., "Joining the Results of Heterogeneous Search Engines", Information Systems, Vol. 33, Issues 7-8, November-December 2008, pp. 658-680, where several sub-methods for performing such join are described; such sub-methods are used by the aforementioned model. The model is effective for giving a first approximation of the solution of the multi-domain query answering problem, but it does not provide an optimal solution, i.e., one which minimizes the cost of access to Search Engines.

The present invention describes a new algorithm that extends the FA algorithm to the context of joins between search engines, thus also providing a solution to the rank-join problem. The characteristics of FA make it possible for the present invention to the rank-join problem to determine, at query formulation time, the optimal execution strategy for a query, even when information on the distributions of the scores of the elements returned by the search engines is not available. This is particularly relevant for the context of search engines over the Internet dealt with by the present invention, where such distributions are generally unknown or, if known, they would be typically subject to change. Another important aspect regarding the present invention is that the optimal execution strategy determined by the present invention is independent of the aggregation function that is used to combine the elements scores in a global combination score. This indicates that no extra access to the search engines is required upon modifications of aggregation function, such as changes of the weights in a weighted sum. Note instead that determining an optimal execution strategy with rank-join algorithms based on TA, including HRJN, necessarily requires knowledge or assumptions on both the score distributions and the aggregation function.

SUMMARY OF THE INVENTION

The present invention deals with answering multi-domain queries; it presents a method and a computer program product for identifying the domains, selecting for each domain one domain-specific search engine and data source to be involved, generating the domain-specific subqueries for each selected search engine, defining a strategy for sending requests to each search engine and data source, and receiving, merging and ranking results, while minimizing the cumulative cost of requests to the search engines and data sources. The result of the multi-domain query is a list of combinations, where every combination consists of a tuple of data, each relative to one of the domains of the query; such data is present in the results returned either by search engines or by data sources. The proposed method provides the "top K" combinations, i.e. the combinations having the highest combination score, as computed by a monotone aggregation function over said combinations. Therefore, the method is essential in order to provide effective management of multi-domain queries by a vast number of users, currently using single-domain or generic search engines.

BRIEF DESCRIPTION OF DRAWINGS

The various features of the present invention will be progressively described in greater detail with reference to the following description, claims, and drawings, wherein reference numerals are reused, where appropriate, to indicate the correspondence between the referenced items, and wherein:

DETAILED DESCRIPTION

Figure 1:
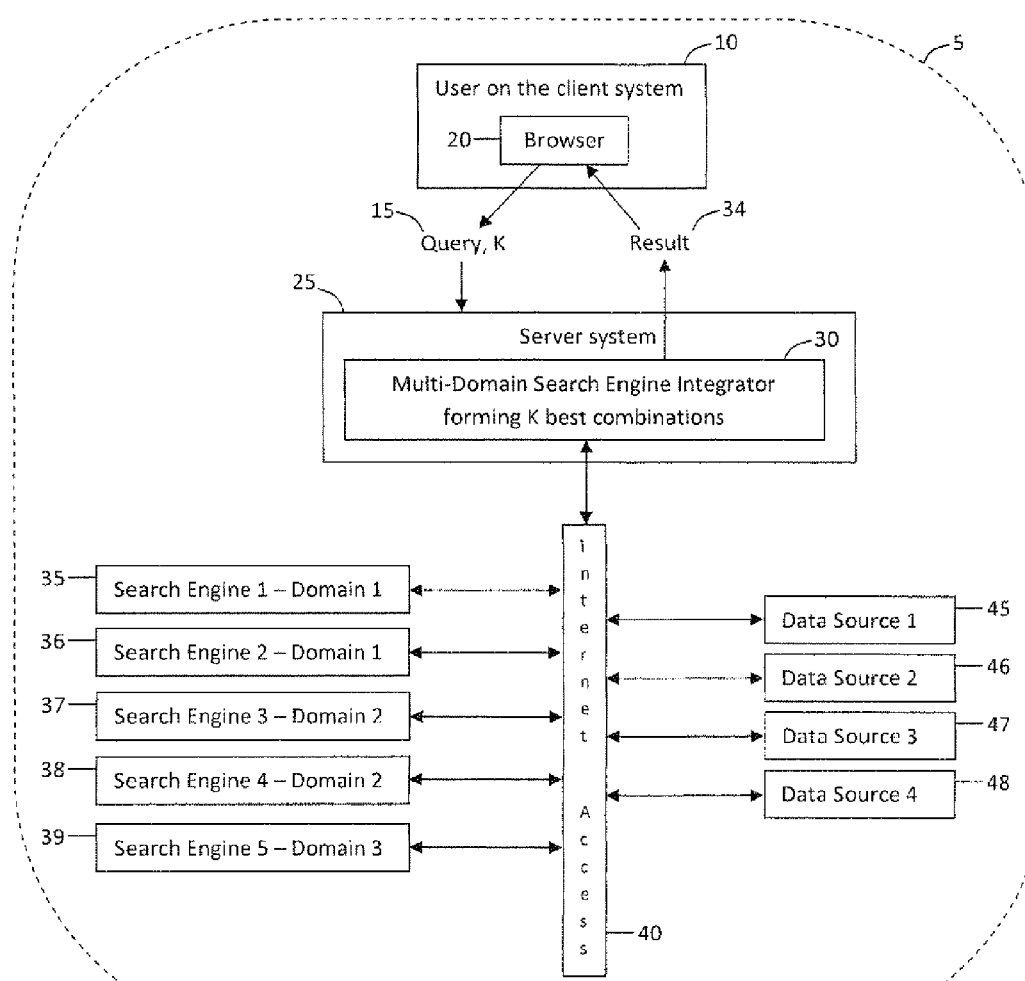
FIG. 1 is a schematic illustration of an exemplary operating environment for computing the best K results of a multi-domain query in which the present invention can be used.

The following definitions provide background information pertaining to the technical field of the present invention, and are intended to facilitate the understanding of the present invention without limiting its scope:

Query: a set of keywords or phrases, possibly separated by logical connectives, submitted by the user. A query submitted to the system causes the computation of k combinations, where k is a parameter submitted by the user together with the query.

Subquery: a subset of the query's keywords or phrases, possibly separated by logical connectives, which is sent to a specific search engine.

Search engine: A system that returns a ranked list of elements in response to a subquery. The search engine uses internal methods, information about Web resources and possibly other factors, such as user's preferences, language, geographical location etc., in order to return elements ranked according to a measure of their relevance, called element score.

Rank: The position of an element in the ranked list returned by a search engine.

Element: An item returned by a search engine or data source, which can take various forms depending on the nature of the search engine or data source. Elements may include attribute-value pairs, links to web pages and, in some cases, documents and image files, audio and video streams, etc. Each element describes a given domain of the query.

Element score: The numerical value associated, either implicitly or explicitly, by a search engine or data source to every element in response to a query. It measures the relevance of the element.

Data source: A system that returns a set of elements in response to a request. The request consists of one or more attribute-value pairs. The elements in the response comprise attribute-value pairs which are equal to the attribute-value pairs in the request.

Request: an interaction with a search engine or with a data source. The interaction with a search engine for answering a given subquery requires several requests, where the response to every request is a chunk of elements, as search engines may produce very long lists of results; however, a limited number of requests is normally sufficient in order to extract, in their responses, the elements which contribute to the top-k combinations. The interaction with a data source requires only one request, consisting of one or more attribute-value pairs. The elements in the response comprise attribute-value pairs which are equal to the attribute-value pairs in the request.

Chunk: Sub-list of consecutive elements from a ranked list of elements. Typically, results from a request sent to a search engine are returned in subsequent chunks of a fixed maximum size.

Sequential access: A request sent to a search engine, whose response consists of a chunk of elements. The first sequential access retrieves a chunk containing the first elements of the ranked list produced by the search engine. Each subsequent sequential access retrieves the next chunk of elements in the ranked list.

Attribute-based access: A request sent to a data source that transmits a value for some given attribute handled by the data source. The response to the request consists of the set of elements that match the supplied value in the given attribute.

Combination: n-ple of elements, such that each element is associated with one domain of the query and is present in the results produced either by search engines or by data sources. The elements in a combination satisfy equality predicates on specific element attributes, called join attributes.

Combination score: The numerical value attributed to the combination, as the global aggregation of the element scores attributed by each search engine to each element. For each query, such global aggregation is a given, monotone aggregation function.

Top-k combinations: The combinations associated with the k highest combination scores. Top-k combinations are the result of the query.

The search engine and data sources hosting a given element, mentioned in the above definitions, may be part of the same computing system, e.g., a software service offering different interfaces supporting sequential and attribute-based access, or instead they may be located upon different computing systems. The distinction between search engines and data sources, which is on purpose made very sharp in the above definitions, is less clear in many Web contexts, where the same computing system make act as search engine or as data source depending on the particular invocation. Therefore, the invention covers also the case of systems which are generically classified as data sources due to their main condition of use but which may act at times as search engines, because they provide sequential access—and then if the multi-domain query uses sequential access such systems are equivalent to search engines for the purpose of this invention; it likewise covers the case of systems which are generically classified as search engines due to their main condition of use, but which may act at times as data sources, because they provide attribute-based access—and then if the multi-domain query uses attribute-based access such systems are equivalent to data sources for the purpose of this invention.

It is to be noted also that the answer to a multi-domain query is a list of combinations, and every combination is an n-ple of n elements, where for every index $i \leftarrow n$, the i-th element of the combination is extracted from exactly one domain-specific search engine or data source. Every combination is thus the result of n−1 join operations between elements; for any two pairs of elements which are joined, the attributes which are used in the join are denoted as "join attributes". The identification of the joins which are required to build a combination is an immediate consequence of the identification of the domains which are required by the query and of the search engines and data sources which are used for each above mentioned domain.

FIG. 1 portrays an exemplary operating environment 5 in which a user from within a client system 10 submits a query 15 and the number K of results that must be produced. The query 15 and the number K are submitted through a browser 20 to a server system 25.

The system 25 comprises a multi-domain search engine integrator system 30. The multi-domain search engine integrator system 30 is able to return a result 34, which comprises the top-K combinations. The result 34 of the query 15 is displayed by the browser 20. To compute the result 34, the system 30 invokes a plurality of search engines 35-39 and data sources 45-48 available through an internet access 40.

Figure 2:
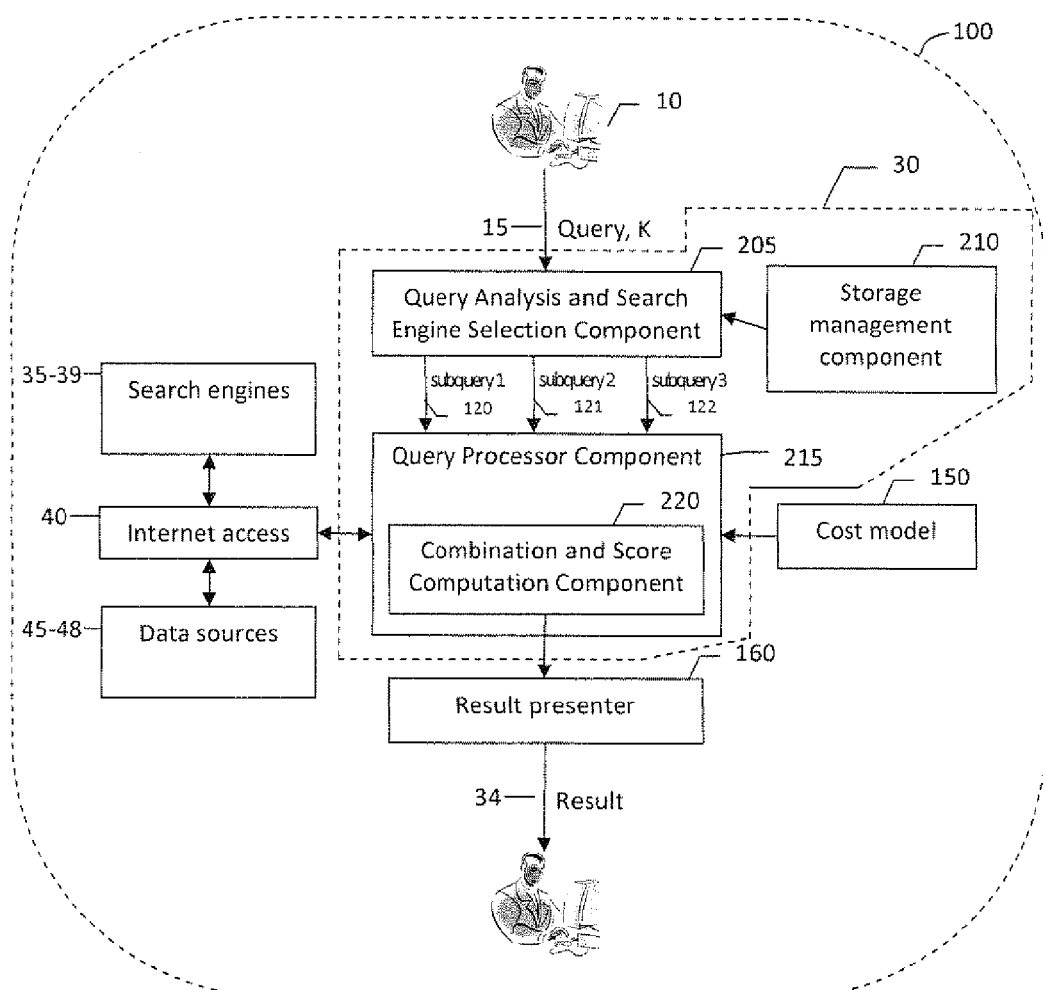
FIG. 2 is a flow chart illustrating the process for computing the best K results of a multi-domain query in the context of the exemplary operating environment of FIG. 1 according to the present invention.

FIG. 2 illustrates a process flow 100 in which the user 10 submits the query 15 and the number K of results that must be produced.

The multi-domain search engine integrator system 30 comprises: a query analysis and search engine selection component 205, a query processor component 215, a score computation component 220 and a storage management component 210. The system 25 comprises also a cost model 150 and a result presenter 160.

The query 15 is processed by a query analysis and search engine selection component 205. Said component 205 decomposes the query in subqueries 120, 121, and 122. Each subquery is associated with a different domain and each domain is associated with a single search engine 35-39 and with a single data source 45-48, based on parameters available from a storage management component 210.

Said subqueries 120-122 are passed on to the query processor component 215, which uses Internet Access 40 in order to produce requests to the search engine 35-39 and data sources 45-48. The requests are sent according to an optimal strategy that minimizes the expected total cost associated with the requests sent to search engines 35-39 and data sources 45-48, based on a cost model 150 establishing how to compute said expected total cost.

Results in the form of lists or sets of elements are then received from said search engines 35-39 and data sources 45-48. Said lists or sets of elements are elaborated by the combination and score computation component 220, which computes the combinations that can be formed with the lists or sets of elements and the corresponding combination scores. Component 220 computes a plurality of combinations so as to include the top-K combinations. It then associates to each combination a combination score and ranks each obtained combination in function of the combination score. Further it extracts the K combinations with highest combination score, so as to minimize the global cost of the query, which is a function of the costs of requests addressed to search engines and of data sources. The K combinations with the highest combination score are passed to the result presenter 160 that shows said combinations forming a result 34 to the user.

It is not considered here the case where the data available to the system are not sufficient to form K combinations. This case is considered in the more detailed description given for FIG. 5.

Figure 3:
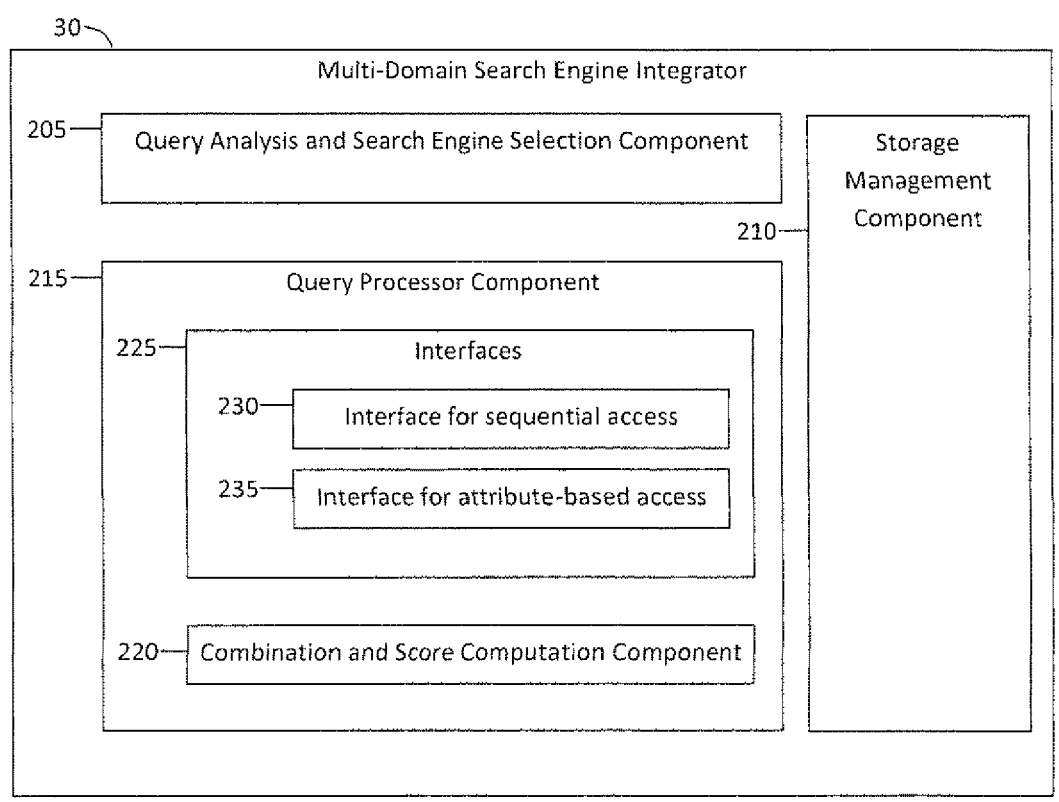
FIG. 3 is a block diagram of the high-level software architecture of the present invention.

FIG. 3 illustrates a block diagram of the high-level architecture of the multi-domain search engine integrator 30. The query analysis and search engine selection component 205 is responsible for parsing the input query 15, in order to determine the domains involved and, for each domain, to identify the search engine and data source that need to be invoked. The store management component 210 comprises a storage medium such as a hard drive or like devices where auxiliary data needed to the functioning of system 30 are stored, including descriptions of domains, search engines, and interfaces. The store management component 210 is also used to store the results produced by the query processor component 215, which comprises two modules. An interfaces component 225 comprises modules for sequential access 230 and attribute-based access 235, which perform requests to search engines and data sources respectively. A combination and score computation component 220 builds combinations of elements obtained by the invoked search engines and data sources; each combination also comprises the corresponding element scores as well as the combination score, which is computed via a monotonic aggregation function of the element scores.

Figure 4:
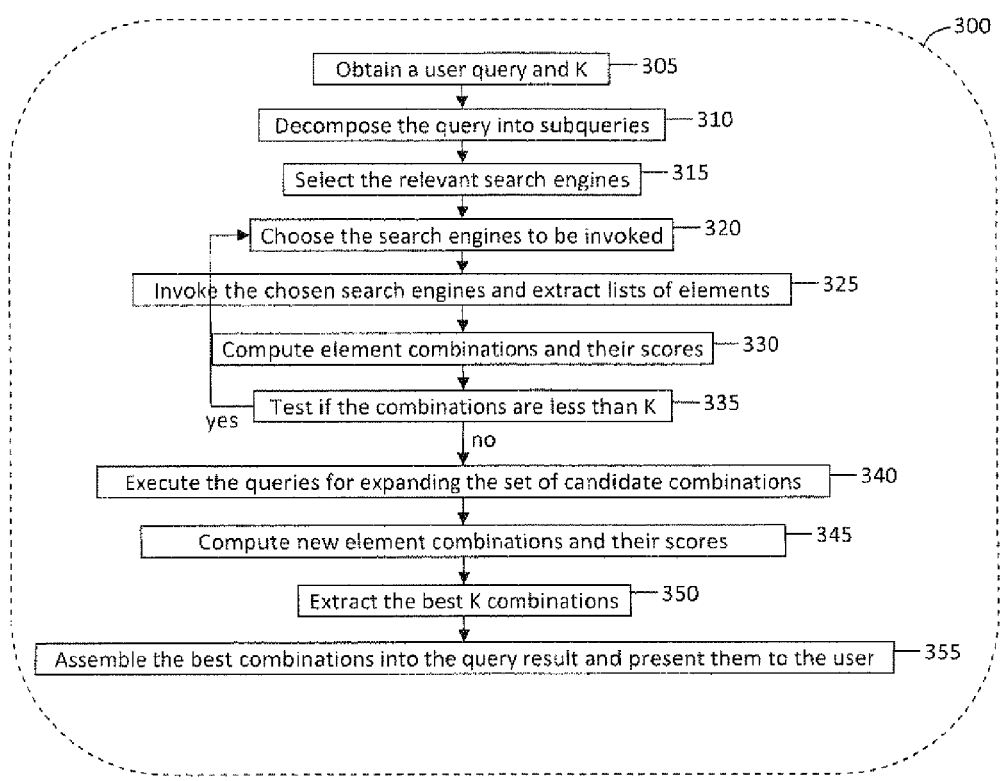
FIG. 4 is a flow chart illustrating in more details the process for computing the best K results of a multi-domain query.

FIG. 4 illustrates a process flow 300 to compute, in the operating environment 5, the best K results of a multi-domain query that requires integrating the answers of multiple search engines and data sources.

The user query 15, consisting of search terms, and a desired number K of results are provided by a user (step 305). The user query is decomposed into different sub queries 120-122 (step 310), each consisting of terms pertaining to some specific domain as determined based on domain descriptions available from the storage management component 210. Based on the sub queries and on search engine descriptions at the storage management component 210, the relevant search engines and data sources to be invoked during query execution are selected from the available search engines 35-39 and data sources 45-48 (step 315).

The search engines selected in step 315 are then used within an iterative method which has the objective of determining the top-K combinations satisfying the user's query. At each iteration, one search engine is chosen (step 320), for subsequent invocation (step 325); the choice of the search engines (step 320) is performed by using an optimal strategy that maximizes the number of combinations that can be formed by using the new elements retrieved thereby minimizing the expected total cost associated with the invocations of search engines and data sources. The effect of the search engine invocation is to return ranked lists of elements. From said lists, new combinations are formed and the associated combination scores computed (step 330).

The number of formed combinations is compared to K (step 335). The process continues with step 320 in case the number of formed combinations is less than K, since not enough combinations candidate to be the top K combinations have been found. If instead the number of formed combinations is greater than or equal to K, the iterative part of the method is complete. Like in FIG. 2, it is not considered here the case where the data available to the system are not sufficient to form K combinations. This case is considered in the more detailed description given for FIG. 5.

The method then uses the set of candidate combinations extracted so far as the start point for generating attribute-based access requests, so as to compute more combinations and associated combination scores in a way that guarantees that the so extended set of candidate combinations includes the top K combinations (step 340). Said queries are subsequently executed (step 345). From the set of all combinations formed so far, the K combinations with highest combination scores are selected (step 350) and then presented as a query result 34 to the user (step 355).

Figure 5:
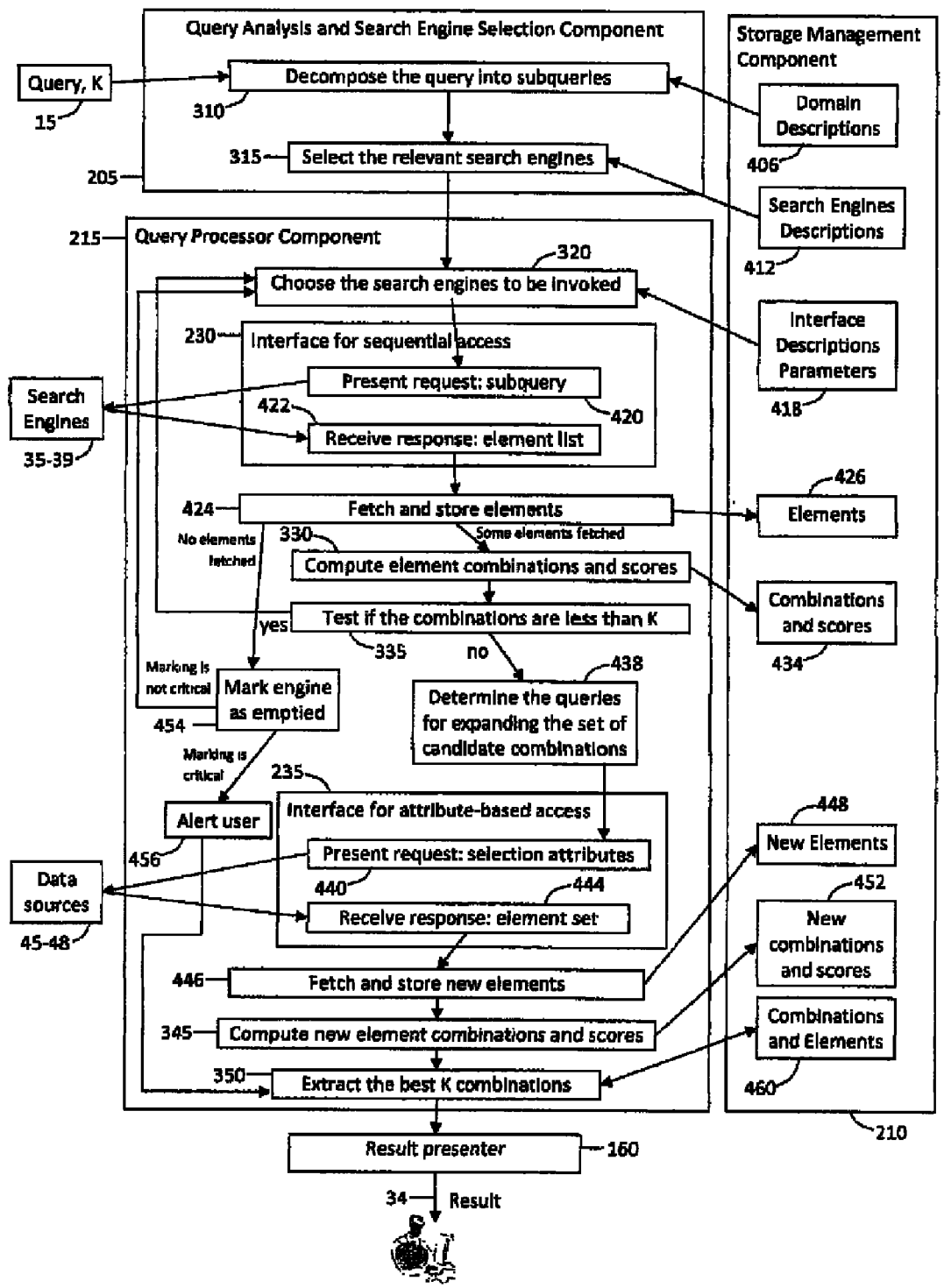
FIG. 5 is a flow chart illustrating in maximum detail the process for computing the best K results of a multi-domain query of FIG. 4 in the context of the high-level software architecture of FIG. 3.

FIG. 5 illustrates the execution process of the proposed invention and details how the architectural components defined in FIG. 3 participate to the process illustrated in FIG. 4.

For the sake of clarity, in a simple running example a user submits to the system a query requesting the best two combinations of hotels and restaurants in Paris, located in the same street. While in the example the query is answered by few combinations for ease of reading, in reality the query produces many combinations.

The query 15 together with the number of desired combinations K is fed to the query analysis and search engine selection component 205. In one embodiment, the query comprises the specification of an aggregation function for aggregating the element scores in order to form a combination score. In another embodiment, a suitable aggregation function is adopted after the selection of search engines, which is next described.

In the running example, it is assumed K=2, and the scores may be represented for the hotels by the official international star rating for hotels (from no star to five stars), and for the restaurants the scores may be expressed as the average evaluation (on a scale from 0 to 4) given by a community of customers reporting their assessment to one the search engines used by the system. As aggregation function the average of the two scores is considered, normalized over a [0,1] interval.

First, the query is decomposed into subqueries 120-122 by the query decomposition and domain selection module 404, in step 310. In one embodiment, the mapping from query terms to subqueries and to domains is predetermined, as the user is asked to enter query terms into predefined forms and each form is mapped to a predetermined subquery and each form field to a predetermined domain. In another embodiment, the mapping between query terms and domains is performed automatically by means of matching algorithms between query terms and domain descriptions 406 available in the storage and management component 210, and such matching algorithm also builds the subquery associated with each domain; the matching algorithm is outside the scope of the present description. In both cases, the query decomposition and domain selection module 404 produces a set of subqueries 120-122, each associated with a specific domain. For each subquery, one relevant search engine is selected (step 315) for invocation, by using search engine descriptions 412 available in the storage and management component 210, thereby associating each subquery with exactly one search engine, and also associating one corresponding data source that provides attribute-based access to the elements of the search engine. In one embodiment, the relevant search engines are selected manually by the user that submits the query. In another embodiment, the search engines are selected automatically, by matching the domain of the subquery with the domain covered by the search engines, as defined in the search engine descriptions.

In the running example, two subqueries correspond to a search for good restaurants and a search for good hotels, associated to the domains of gastronomy and touristic accommodations. For the sake of the example, two services, namely Hotels and Restos, are assumed as available on the Web, both allow for sequential as well as attribute-based access. Thus, both services behave as search engines, when invoked sequentially, and as data sources, when invoked based on attribute values.

The execution of the query is governed by the query processor component 215, which invokes the search engines and integrates the results in the form of element combinations. The result is obtained iteratively; at each iteration, one or more search engines are chosen (step 320), the selected search engines are invoked and each one returns a chunk of elements. The specific order of invocation is determined by the query processor component 215. Said specific order of invocation is optimally chosen; optimality consists in minimizing the expected total cost of sending requests to search engines and data sources, which depends on the number and cost of each invocation. Therefore, the optimization is based upon estimates of the costs of invocation of the search engines and data sources which depend on the sizes of their chunks, the estimated number of occurrences of the elements indexed by the search engines, and the cardinalities of the sets of elements satisfying attribute-based accesses, which are all available in the interface descriptions parameters 418.

In the running example, both search engines are chunked, and sequential accesses to Hotels are more costly than sequential accesses to Restos, while for attribute-based accesses the opposite holds. The cardinalities of the two services are exemplified taking true values from actual services at the time of writing: 858 indexed hotels in Paris, located in 592 different streets, and 1198 restaurants, in 977 distinct streets, 188 of which are in common with those of the hotels. For the sake of exemplification, Hotels returns chunks of size 2, while Restos returns chunks of size 3.

In order to determine the optimal order of invocation at step 320, as described in the technical report "Cost Aware top-k join algorithms", by S. Ceri, D. Martinenghi, and M. Tagliasacchi [tech. rep. n° 2009.16 at Politecnico di Milano, Dipartimento di Elettronica e Informazione, July 2009], the execution access strategy can be formulated as a constrained optimization problem with integer variables, whereby the method determines the number of accesses to the search engines, so as to maximize the number of combinations that can be formed, subject to a target cost constraint. In particular, the number of combinations can be approximated by the product of the numbers of sequential accesses to the various search engines, multiplied by a constant factor, that depends on the aforementioned parameters, and that is therefore negligible for the maximization problem at hand. The cost function is expressed, instead, by summing the costs incurred by the sequential accesses and those incurred by the attribute-based accesses. The former ones can be obtained by multiplying the number of sequential accesses made on each search engine by its sequential access costs. The latter ones can be obtained by multiplying the number of distinct join attributes retrieved from each search engine by the sum of the attribute-based access costs of all the other data sources that participate in the join. Said cost function is constrained to be within a given cost threshold, indicating the amount of available resources. An approximate solution can be found by relaxing the integer constraint and solving the Karush-Kuhn-Tucker equations for the relaxed problem. Instead of solving said maximization problem under said cost constraint for a fixed value of the threshold, the threshold is varied over a positive interval, so as to obtain a locus of points that represents the access strategy that maximizes the number of retrieved combinations for each step of the algorithms. In particular, said trajectory also determines which search engines to access at each step of the algorithm.

In the running example, the optimal strategy consists in a sequence of accesses characterized by the fact that such sequence includes choices of search engine to be invoked such that more sequential requests are made to Restos than to Hotels, because it is cheaper to make sequential accesses to Restos and it is also cheaper to make the corresponding attribute-based accesses to Hotels.

In step 320, the query processor component 215 invokes the search engines, chosen by the optimization method from the available search engines 35-39, by presenting the associated subqueries as request 420 and receiving new chunks of ranked elements 422 in response; the chunk size depends on the chosen search engine. For every search engine and associated subquery, the first chunk contains the top elements in the search engine's ranking; the subsequent chunks contain new elements which immediately follow, in the search engine's ranking, the elements which were already retrieved for that subquery, and were stored within an appropriate repository 426. Module 424 adds the new chunks to the repository 426.

At the end of each iteration, if the received response 422 contains some elements, then module 424 passes the control to step 330, which computes combinations and combination scores by joining the elements and by computing the aggregation function associated with the query, and stores each combination with its score in an appropriate repository 434 in the Storage Management Component 210. If the number of combinations found is smaller than K (step 335), the process is re-iterated, by choosing the search engines to be invoked, at step 320.

If, at the end of an iteration, the received response 422 contains no elements, then the invoked search engine is marked as emptied (step 454), because all of its elements have been retrieved.

If a search engine is marked as emptied right after the first invocation, said marking is considered critical, since this means that no combination element can be formed. In this scenario, therefore, the query has failed and an alert is issued by module 456, and K is set to zero.

If all search engines are marked as emptied, said marking is also considered critical, since this means that no more combinations can be formed, because all possible elements resulting from requests to all search engines have been retrieved. In this case, it is not possible to obtain K combinations, because there exist only H combinations, where H is the number of combinations obtained so far, being H minor than K. Therefore, module 456 alerts the user about this circumstance and lets K=H. If H is equal to zero, the query fails. Otherwise, if some search engines are marked as emptied but some other search engines are not marked as emptied, then such situation is not considered critical, since by sending requests to the search engines which are not emptied more elements can be received and more combinations can be formed. In such case, module 454 passes the control back to step 320, but no request will then be sent to those search engines which are marked empty.

If the number of combinations is greater than K, there is still no guarantee that such combinations include the top K combinations; however, there is already a guarantee that such top K combinations can be found by computing additional combinations obtained by joining the elements already retrieved from search engines and stored in the element storage 426 with elements that will be produced as responses to requests from data sources; therefore, no more sequential accesses to search engines are needed, and only attribute-based accesses to data sources are required.

In the running example, K=2 combinations have been found after one sequential access to Hotels and two sequential accesses to Restos, and that the repository 426 contains the following results, where different chunks are separated by a double line:

| Hotel name | Hotel street | Hotel score |
|---|---|---|
| H1 | S1 | 5 |
| H2 | S2 | 4 |

| Rest. name | Rest. Street | Rest. Score |
|---|---|---|
| R1 | S3 | 3.9 |
| R2 | S1 | 3.8 |
| R3 | S4 | 3.7 |
| R4 | S3 | 3.7 |
| R5 | S2 | 3.6 |
| R6 | S5 | 3.5 |

The above results determine the two following combinations, which are stored in the repository 434:

| Hotel name | Rest. Name | Hotel Score | Rest. Score | Street | Combined score |
|---|---|---|---|---|---|
| H1 | R2 | 5 | 3.8 | S1 | 0.975 |
| H2 | R5 | 4 | 3.6 | S2 | 0.85 |

These are not necessarily the top K combinations, now there is the guarantee that each of the top 2 combinations is formed with at least one of the hotels and restaurants retrieved sequentially so far, i.e., H1, H2, R1, R2, R3, R4, R5, and R6.

Then, at step 438, the set of attribute-based accesses that need to be performed in order to compute all candidate combinations (and associated combination scores) containing the top-k combinations are determined. In particular, if E is an element already responded by a search engines and stored in the element storage 426, and the data source S can be joined with E, and Vi are the values of the join attributes Ai used in the join between said element E and data source S, then an attribute-based access is directed to the data source S, such that the attribute-based access request consists of attribute-value pairs <Ai, Vi>. Said accesses are then executed via the interface for attribute-based access 235 by presenting a request 440 to the relevant data source and receiving a set of elements 444 in response.

In the running example, attribute-based accesses to Restos are required with values S1 and S2, and to Hotels with values S1, S2, S3, S4, and S5.

These new elements, together, if available, with their element scores, are fetched and stored by a module 446 in a repository 448 provided in the storage management component 210. Step 345 computes new combinations and combination scores by joining the new elements and by aggregating their element scores retrieved by the different search engines and data sources via the aggregation function associated with the query; the new combinations are stored in an appropriate repository 452 in the storage management component 210.

In the running example, the attribute-based accesses return the following elements, stored in the repository 448, where different accesses are separated by a triple line.

| Hotel name | Hotel street | Hotel score |
|---|---|---|
| H1 | S1 | 5 |
| H2 | S2 | 4 |
| H3 | S5 | 2 |
| H4 | S5 | 1 |

| Rest. name | Rest. Street | Rest. Score |
|---|---|---|
| R2 | S1 | 3.8 |
| R7 | S1 | 3.4 |
| R5 | S2 | 3.6 |

The attribute-based accesses reveal that there are two new hotels (H3 and H4) in street S5, but no new hotels in the other streets S1, S2, S3 and S4. Also, there is a new restaurant (R7) in street S1, but no new restaurants in street S2. Therefore, the following three new combinations are stored in repository 452:

| Hotel name | Rest. Name | Hotel Score | Rest. Score | Street | Combined score |
|---|---|---|---|---|---|
| H3 | R6 | 2 | 3.5 | S5 | 0.6375 |
| H4 | R6 | 1 | 3.5 | S5 | 0.5375 |
| H1 | R7 | 5 | 3.4 | S1 | 0.925 |

From the set of all combinations, the K combinations with highest combination scores are extracted in step 350, then stored in another repository 460 provided in the Storage Management Component 210, and finally presented as a query result 34 to the user by module 160.

In the running example, the top K combinations are the following ones:

| Hotel name | Rest. Name | Hotel Score | Rest. Score | Street | Combined score |
|---|---|---|---|---|---|
| H1 | R2 | 5 | 3.8 | S1 | 0.975 |
| H1 | R7 | 5 | 3.4 | S1 | 0.925 |

What is claimed is:

1. A method for extracting, merging and ranking results produced by executing multi-domain queries over "n" domain-specific search engines, said method comprising:
   obtaining a query and an expected number of results K by the user through a user interface;
   decomposing said query into "n" subqueries and associating each subquery with exactly one domain of the "n" domain-specific search engines;
   selecting one search engine for each said domain and one data source for each said search engine, wherein the selection of search engines used for answering the query determines also a strategy for building a combination of "n" elements among those returned as result from the "n" domain-specific search engines and data sources, wherein every combination is produced as result of n−1 join operations between elements, such that every combination comprises exactly one element for each domain;
   wherein the method comprises the further steps of: performing sequential accesses to each said search engine in function of the associated subquery and receiving in response results consisting of lists of elements;
   performing attribute-based access to each said data sources in function of results responded by search engines and receiving in response results consisting of sets of elements;
   computing a plurality of combinations, each of which comprising "n" elements;
   associating with each combination a combination score and ranking each element combination in function of the combination score;
   extracting the expected number of results K of combinations with the highest combination score, so as to minimize a global cost of execution of said query, the cost being a function of the costs of requests to search engines and to data sources.

2. The method of claim 1, wherein the association of a score to each combination is performed by aggregating the element scores retrieved by the different search engines and data sources by an aggregation function, the latter being associated with the query.

3. The method of claim 2, wherein the step of performing sequential access to the selected search engines initially performs one request to every search engines, and receives as result a first sub-list of elements produced by every search engine as answer to the requests.

4. The method of claim 1, wherein the step of computing a plurality of combinations comprises the strategy for building combinations of elements by using said sub-lists of elements, thus producing the first set of combinations, and further the step of storing said combinations are stored in the memory associated with the query.

5. The method of claim 1, wherein if the number of combinations is less than the number of results K then:
   a. one or more of the search engines are chosen;
   b. a sequential access is performed to every said chosen search engine, receiving as result new sub-lists of elements responding to the access, and said elements are stored in memory associated with the query;
   c. the strategy for building combinations of elements is applied to the said new sub-lists of elements and the lists of already available elements, producing new combinations, and said combinations are stored in memory associated with the query.

6. The method of claim 5, wherein after step b. those search engines that have returned no elements are marked as emptied.

7. The method of claim 5, wherein after step b. if all search engines are marked as emptied, then a message informs the user that it is not possible to form the number K of combinations, and therefore the result will include only H combinations, where H is the number of currently formed combinations and if H is equal to zero the query fails.

8. The method of claim 5, wherein either after step c. at least the number K of combinations are produced, or after step b, only H combinations are produced, and K is set equal to H.

9. The method of claim 8, wherein every distinct value V of every join attribute of every said K combinations is used for determination of required attribute-based accesses, and then all said attribute-based accesses are performed, producing as result new sets of elements, and said elements are stored in memory associated with the query.

10. The method of claim 1, wherein the strategy for building combinations of elements is applied to the said new sub-lists of elements and the lists of already available elements, producing new combinations, and said combinations are stored in memory associated with the query.

11. The method of claim 10, wherein the K combinations with the highest score present in memory are presented as the result of the query.

12. A computer program product comprising a set of executable instruction codes stored on a computer readable storage medium, wherein said set of executable instruction codes performs the steps of a method for extracting, merging and ranking results produced by executing multi-domain queries over "n" domain-specific search engines, the method comprising:
   obtaining a query and an expected number of results K by the user through a user interface;

decomposing said query into "n" subqueries and associating each subquery with exactly one domain of the "n" domain-specific search engines;

selecting one search engine for each said domain and one data source for each said search engine, wherein the selection of search engines used for answering the query determines also a strategy for building a combination of "n" elements among those returned as result from the "n" domain-specific search engines and data sources, wherein every combination is produced as result of n−1 join operations between elements, such that every combination comprises exactly one element for each domain;

wherein the method comprises the further steps of: performing sequential accesses to each said search engine in function of the associated subquery and receiving in response results consisting of lists of elements;

performing attribute-based access to each said data sources in function of results responded by search engines and receiving in response results consisting of sets of elements;

computing a plurality of combinations, each of which comprising "n" elements;

associating with each combination a combination score and ranking each element combination in function of the combination score;

extracting the expected number of results K of combinations with the highest combination score, so as to minimize a global cost of execution of said query, the cost being a function of the costs of requests to search engines and to data sources.

13. A computer program product according to claim 12, wherein it comprises further:

a first set of instruction codes for reading the query from an interface;

a second set of instruction codes for storing the data which is used for responding to the query;

a third set of instruction codes for processing the query and writing the results of the query on an interface presented to the user.

14. The computer program of claim 13, wherein the said first set of instruction codes for reading the query comprises:

a set of instruction codes for reading the number K of expected results by the user from the interface;

a set of instruction codes for decomposing the query into subqueries and associating each subquery with one domain;

a set of instruction codes for selecting one search engine for each domain and one data source for each selected search engine.

15. The computer program of claim 13, wherein the data used for responding to the query comprise:

data existing prior to the query execution, comprising: domain descriptions; search engine descriptions, said descriptions including the association of search engines to their domain of specialization; data source description, including the association of data sources to search engines; and interface description parameters, said parameters including the average cost of each request to a search engine or data source;

data produced during query execution, comprising elements with properties, said properties consisting of pairs including one attribute and one value; and combinations of elements with their element scores.

16. The computer program of claim 13, wherein the said instruction codes for processing the query comprise:

instructions for choosing the search engines to be invoked in the next step of said query processing method;

instructions for presenting to said chosen search engines a new request and for receiving the response, consisting of an element sub-list, and for storing said sub-list of elements in the memory associated with the query;

instructions for computing the new combinations and combination scores which are produced by using the said new sub-lists of elements and the already available lists of elements, and for storing said combinations and combination scores in the memory associated with the query; and instructions for testing if existing combinations are less than K, and repeating until existing combinations are at least K or all existing elements have been retrieved without producing K combinations, but producing instead H combinations, with H<K.

17. The computer program of claim 14, wherein the said instruction codes for processing the query comprises in addition:

instructions for determining the attribute-based queries that should be addressed to the data sources;

instructions for performing said attribute-based queries to said data sources and retrieving new elements;

instructions for storing said elements in the memory associated with the query; instructions for computing the new combinations and combination scores which are produced by using the said new elements and the already available lists of elements, and for storing said combinations and combination scores in the memory associated with the query;

instructions for selecting the K combinations with the highest combination score; and instructions for assembling the best combinations into the query result and present them to the user.

* * * * *